(No Model.)  3 Sheets—Sheet 1.

W. & T. C. OVENS.
Meat Mincing Machine.

No. 235,561.  Patented Dec. 14, 1880.

(No Model.) 3 Sheets—Sheet 2.

W. & T. C. OVENS.
Meat Mincing Machine.

No. 235,561. Patented Dec. 14, 1880.

Witnesses
William Thomas Whiteman
Edwin Rich
James P. Taylor

Inventors
William Ovens
Thomas Charles Ovens (No Model.) 3 Sheets—Sheet 3.
W. & T. C. OVENS.
Meat Mincing Machine.
No. 235,561. Patented Dec. 14, 1880.
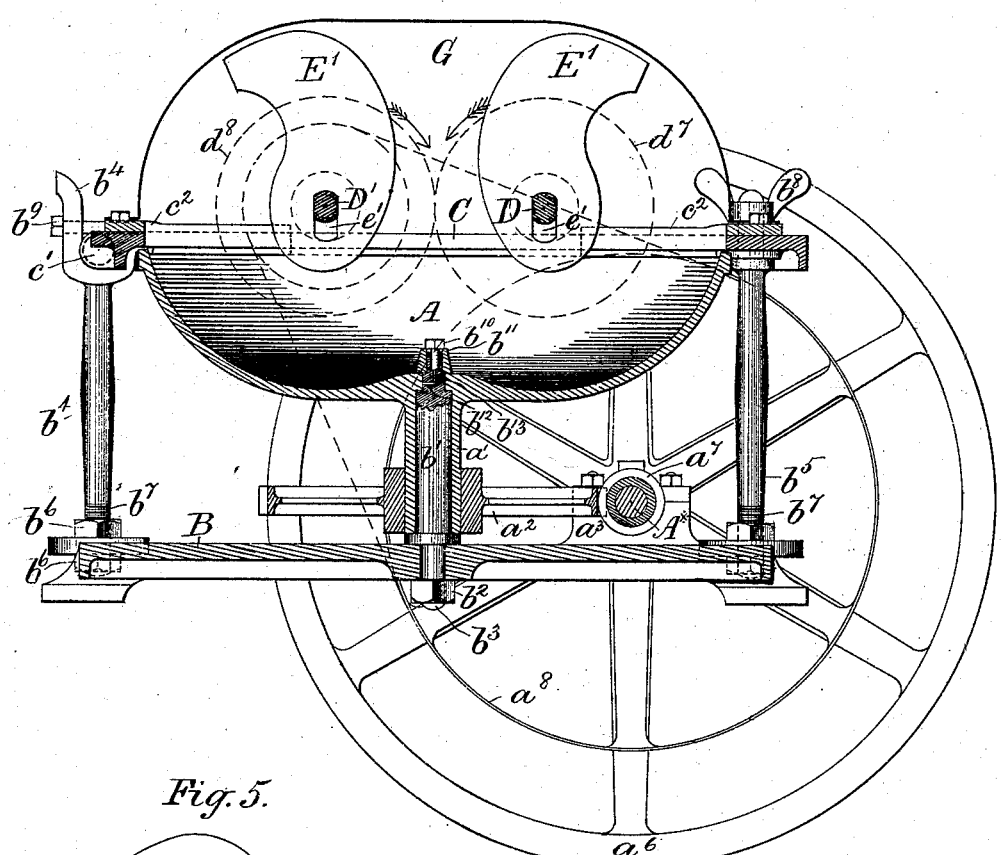
Fig. 3.
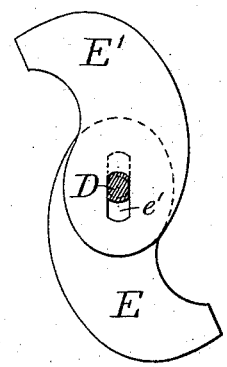
Fig. 5.
Fig. 4.
Witnesses
Inventors
William Ovens
Thomas Charles Ovens

UNITED STATES PATENT OFFICE.

WILLIAM OVENS AND THOMAS C. OVENS, OF CLERKENWELL, ENGLAND.

MEAT-MINCING MACHINE.

SPECIFICATION forming part of Letters Patent No. 235,561, dated December 14, 1880.

Application filed September 18, 1880. (No model.) Patented in England July 21, 1879.

*To all whom it may concern:*

Be it known that we, WILLIAM OVENS and THOMAS CHARLES OVENS, of Clerkenwell, in the county of Middlesex, England, (engineers,) have invented new and useful Improvements in Machines for Mincing Meat, which improvements are fully set forth in the following specification, reference being had to the accompanying drawings.

Our invention relates to that class of machines for mincing meat in which the meat is cut by knives carried by a rotatory shaft and working in a rotatory bowl, the said shaft and bowl rotating in planes at right angles to each other.

Figure 1:
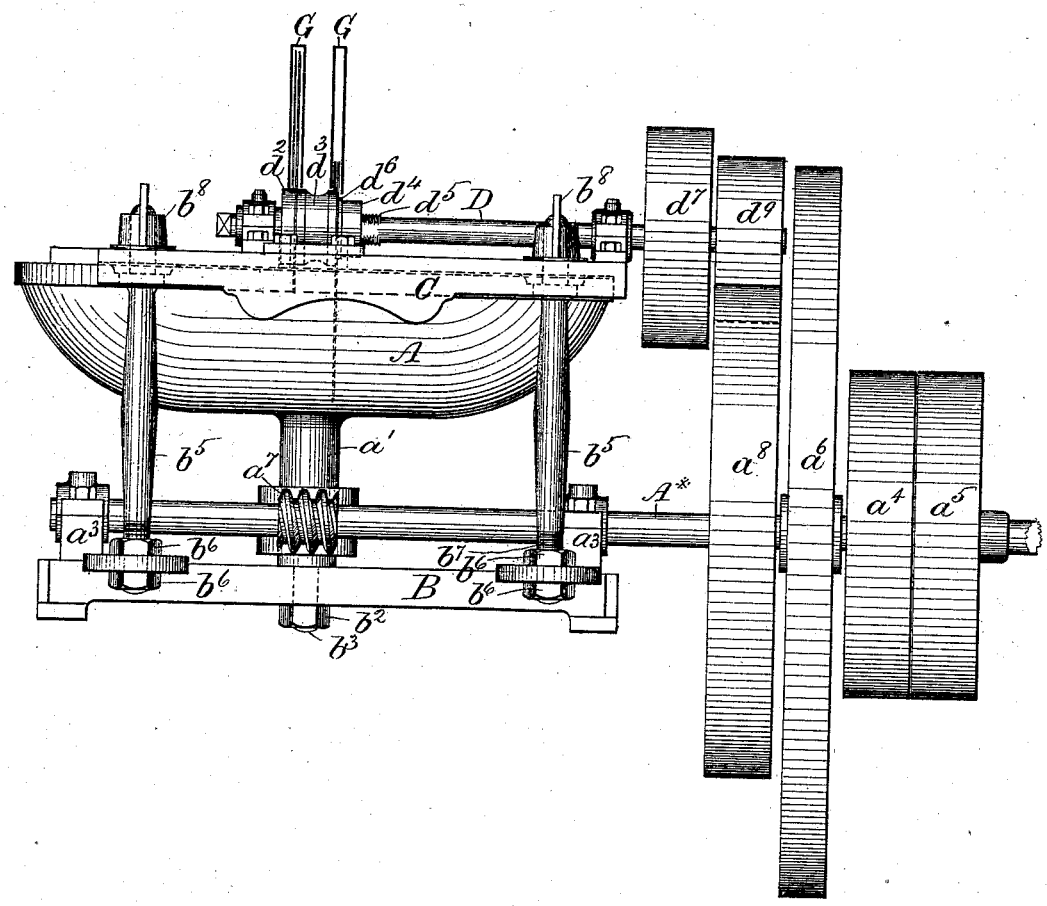
Figure 2:
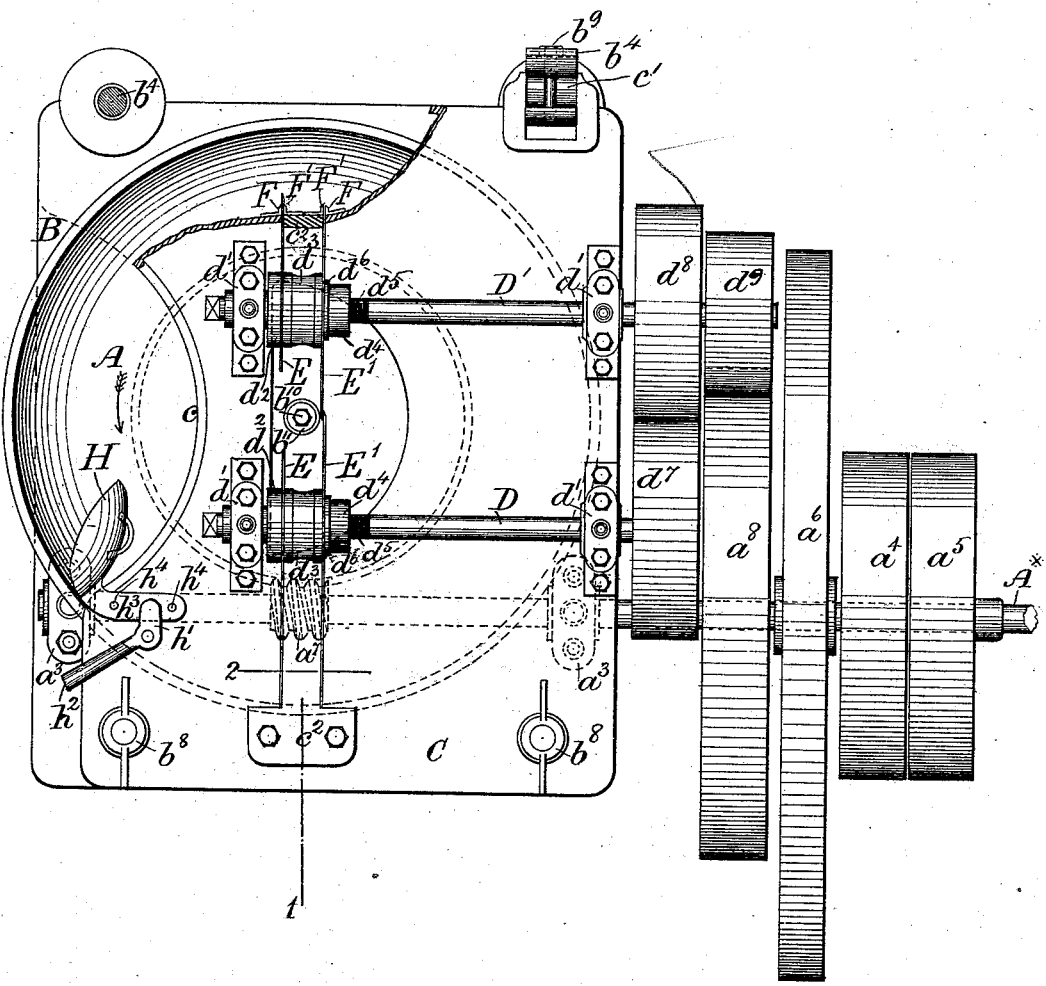

Figure 1 of the accompanying drawings is an elevation; Fig. 2 a plan, and Fig. 3 a vertical section, taken on the line 1, Fig. 2, of a machine for mincing meat constructed according to our invention. Figs. 4 and 5 are details, hereinafter referred to.

The same letters and figures of reference indicate the same parts in the several figures of the drawings.

A is the rotatory bowl, on the under side of which is formed a socket, $a'$.

B is the base-plate, to which a rod or shaft, $b'$, is secured by means of a nut, $b^2$, which takes onto a screw, $b^3$, on the said rod. The socket $a'$ on the bowl A fits over the rod $b'$, which forms the axis on which the said bowl rotates. $a^2$ is a worm-wheel keyed on the socket $a'$.

A* is the main shaft, working in bearings $a^3 a^3$ and carrying fast and loose pulleys $a^4 a^5$, a fly-wheel, $a^6$, and a worm, $a^7$, which gears with the worm-wheel $a^2$.

$b^4 b^4 b^5 b^5$ are standards, which are secured to the base-plate by means of screw-nuts $b^6 b^6$, which engage with screw-threads $b^7 b^7$ formed on the lower ends of the said standards.

C is a table, which we term the "knife-table," supported by the said standards, one side of the said table being hinged to the standards $b^4 b^4$ at $c' c'$, and the other side being secured by means of nuts $b^8 b^8$, which screw onto the upper ends of the standards $b^5 b^5$, which project above the knife-table C. $c$, Fig. 2, is an opening in the knife-table through which the meat may be withdrawn from or fed into the bowl while the machine is in action. The knife-table may be readily freed from the standards for removal, when necessary, by unscrewing the nuts $b^8 b^8$ and withdrawing the screw-bolts $b^9 b^9$, which confine the said table on the hinged side. In Fig. 2 a portion of the table C is shown broken away, in order that the parts beneath it may be clearly seen. By means of the screw-nuts $b^6 b^6$ and screws $b^7 b^7$ the distance between the knife-table C and the upper part of the bowl may be regulated.

D D' are shafts mounted in bearings $d' d'$ on the knife-table, and E E E' E' are knives carried by the said shafts, which knives have slots $e' e'$ (see Figs. 3 and 5) formed in them, through which the shafts on which they are mounted are passed. $d^2 d^2$ are shoulders or abutments formed on the shafts D D', against which shoulders or abutments the knives E E bear. $d^3 d^3$ are collars or tubes by which the pairs of knives are kept apart, and $d^4 d^4$ are screw-collars or nuts by which the knives are locked in their places, the said nuts $d^4 d^4$ engaging with screw-threads $d^5 d^5$, formed on the said shafts and bearing against washers $d^6 d^6$, which bear against the knives E' E'. Those parts of the shafts D D' on which the knives are mounted are flattened, as shown in Fig. 3, in order to prevent the knives from turning thereon.

The arrangement hereinbefore described for securing the knives admits of their being readily adjusted when they become worn, the adjustment being effected by loosening the screw-nuts $d^4 d^4$ and sliding the knives on the shafts in the direction of the length of the slots. When the knives are adjusted they are again secured in the position to which they have been brought by screwing up the nuts $d^4 d^4$.

We prefer to arrange the knives on their shafts, as illustrated in Fig. 5 of the accompanying drawings, which is a transverse section of one of the shafts, showing a pair of knives secured thereto.

$d^7 d^8$ are india-rubber-faced drums keyed on the knife-shaft D D', and $d^9$ is pulley keyed on the shaft D. Motion is communicated to the pulley $d^9$ by means of a band (indicated in dotted lines in Fig. 3) passing over the said pulley and over a pulley, $a^8$, keyed on the shaft A*. The drums $d^7 d^8$ being geared together the knives are caused to work in opposite directions, whereby vibration of the machine when it is in action is avoided. The directions in which the drums and knives and bowl revolve when the machine is in action are indicated by the arrows in Figs. 2 and 3.

F F are fixed cutters, secured, by screws $f'$ $f'$, to the under side of the knife-table C, at the sides of the slot in which the knives E E E' E' work. The holes in the said cutters through which the screws $f'$ $f'$ pass, are slotted, so as to admit of the cutters being very accurately adjusted when their edges become worn.

$c^2$ $c^2$ are plates screwed to the knife-table C, and nearly closing the spaces between the knives E E E' E', to the under sides of which plates other cutters, F' F', are secured, so as to be capable of adjustment in the same manner as the cutters F F.

The arrangement of the knives or cutters F F F' F' and plates $c^2$ is clearly shown in Fig. 4, which is a section of part of the knife-table, taken on the line 2, Fig. 2.

$b^{10}$ is a screw, which takes into a screwed hole formed into the upper end of the rod $b'$, the under side of the head of which screw bears on the upper face of a collar or washer, $b^{11}$, which keeps the bowl A in its place. To provide for the lubrication of the bearing of the said bowl holes $b^{12}$ $b^{13}$ are drilled in the said rod $b'$, into which holes oil may be poured when the screw $b^{10}$ is removed.

G G are guards or covers, screwed to the table C, over the slots in which the knives work. These guards or covers prevent the meat from being thrown out of the machine when it is in action.

H is a plate or scraper secured to the knife-table C by means of a button, $h'$, provided with a lever-handle, $h^2$, which bears upon a tang, $h^3$, formed on the said scraper, and having holes formed in it, which engage with pins or studs $h^4$ $h^4$, the heads of which project from the face of the table C. The said plate or scraper projects into and lies nearly in contact with the inner side of the bowl.

When the machine is in action the plate or scraper H, as the bowl rotates, causes the meat (which by the action of the knives has been collected on the sides of the bowl) to be detached therefrom, and to fall toward the middle of the bowl, whereby the meat is thoroughly exposed to the action of the knives, and the meat does not require to be turned over and mixed by hand, as in ordinary machines.

In order to ascertain if the meat has been sufficiently minced, portions of it may be removed from the bowl at the uncovered part without stopping the machine. When it is found that the meat has been sufficiently minced the screws $b^8$ $b^8$ are removed, and the knife-table C is turned back on its joint or hinges $c'$ $c'$. The bowl is thus uncovered and the meat may be removed, or the meat may be removed from the bowl at the uncovered part, and the bowl may be recharged without stopping the machine.

If it be preferred to mix the meat by hand, the blade H may be liberated by turning aside the button $h'$, and may then be lifted off the studs $h^4$ $h^4$.

When in use the machine is secured to a bench or table by bolts passed through the base-plate B.

We prefer to coat the interior of the bowl and the under side of the knife-table with enamel, so that the meat may not be injured by contact with the said parts.

Although we prefer to mount two knives on each shaft and to use two shafts, a greater or less number of knives may be mounted on the said shafts; and instead of two shafts one only may be used.

Having now described the nature of our invention of improvements in machines for mincing meat and the manner in which it is to be performed, we wish it to be understood that we do not limit ourselves to the precise details hereinbefore described, as they may be varied without departing from the nature of our invention; but

We claim as our said invention—

1. A machine for mincing meat comprising the following elements, in combination: two horizontal shafts rotating in opposite directions and carrying knife-blades or cutters, a rotary bowl in which the meat is minced by the action of said knives, stationary cutters attached to the under side of the knife-table of said machine, and a scraper also attached to said knife-table, substantially as described.

2. In a machine for mincing meat, the stationary or fixed cutters adjustably secured to the under side of the knife-table of said machine, substantially as described.

3. In a machine for mincing meat having a rotary bowl and rotary cutters or knives, the combination, with said rotary cutters or knives, of fixed cutters secured to the under side of the knife-table on the edges of the slots through which said rotary cutters pass, substantially as described.

4. The combination, in a meat-mincing machine, of two shafts rotating in opposite directions, each shaft carrying two knives adjustably secured thereto, a rotary bowl with stationary cover, which forms the knife-table of said machine, and which carries the bearings of said shafts, and stationary cutters or knives secured on the under side of said knife-table and adapted to co-operate with said rotary cutters, substantially as described.

WILLIAM OVENS. [L. S.]
THOMAS CHARLES OVENS. [L. S.]

Witnesses:
WILLIAM THOMAS WHITEMAN,
   7 *Staple Inn, London.*
EDWIN RICH,
   71 *Cornhill, London, Notary's Clerk.*